Sept. 10, 1929.   D. TAYLOR   1,728,018
COTTON SEED DELINTING MACHINE
Filed Oct. 13, 1928
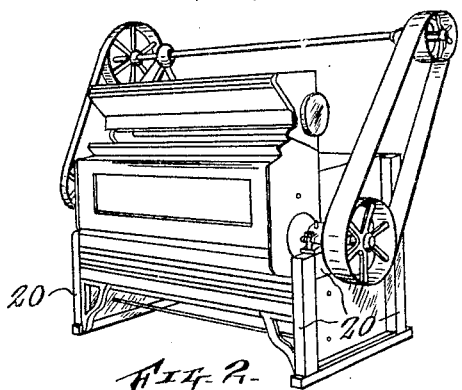
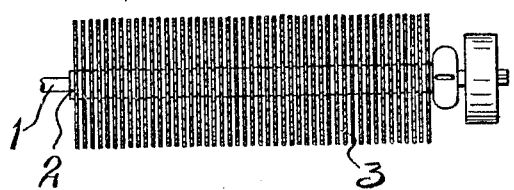
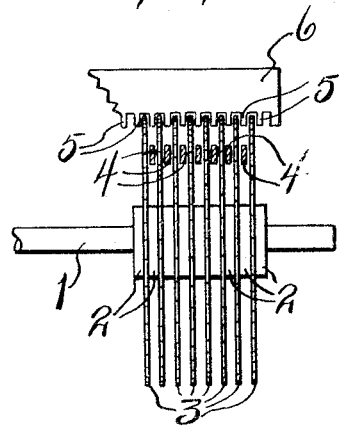
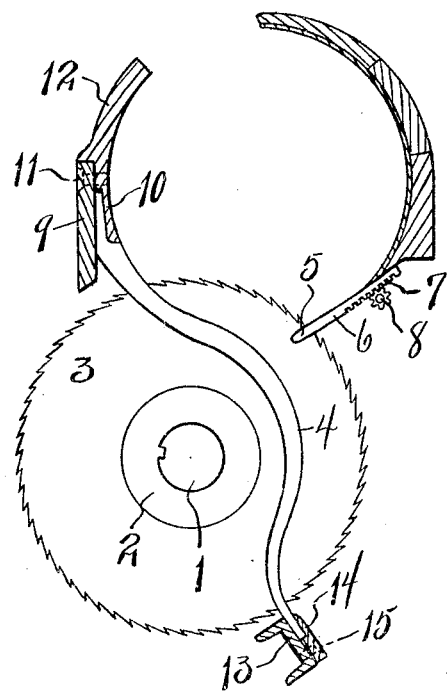
Inventor
DICK TAYLOR
By A. D. Jackson
Attorney Patented Sept. 10, 1929.

1,728,013

UNITED STATES PATENT OFFICE.

DICK TAYLOR, OF PARIS, TEXAS.

COTTONSEED-DELINTING MACHINE.

Application filed October 13, 1928. Serial No. 312,239.

My invention relates to machines for delinting cotton seed; and the object is to provide a gang of greatly increased numbers of saws without increasing the length of the space for the gang of saws and to provide newly constructed space blocks and to provide a new construction of space blocks for the saws and to provide an improved rake and improved ribs and to provide improved means for holding the ribs in place. The advantage of the re-organized saw and rib and space block construction are that in a given length of time a greater tonnage of seed goes through the machine as a consequence of the increased number of saws and the re-arrangement and re-construction of the ribs and the rake and space blocks. A greater amount of lint is removed from the seed in a given length of time. In actual service conditions, the re organized linting machines have been thoroughly tested and on account of the greater work accomplished, the speed of the condensers for taking care of the lint has been almost doubled. This is positive proof of the greatly increased efficiency of the re organized machines. Another advantage is in the saving of time and expense in sharpening the saws. For illustration, the time of changing the saws of ten machines of 140 saws each, or 1400 saws, is no longer than changing the saws of ten machines of 106 saws each, or 1060 saws. Another advantage is notwithstanding the increased number of saws no more power is required to drive the 1400 saws than would be required to drive the 1060 saws. An explanation of this is that the saws are so close together that they form almost a continuous surface for aiding in rolling the seed in the roll box whereas in the old construction more seed would go down between the saws and cause friction of the seed against the ribs. For illustration, it takes ten horse power to run one machine. Ten machines of the improved type would require one hundred horse power. To use enough machines of the old type to accomplish as much as the ten machines of the improved type would require approximately 130 horse power.

Reference is had to the accompanying drawings which form a part of this application.

Fig. 1 is a perspective view of a delinting machine.

Fig. 2 illustrates a portion of a gang of saws.

Fig. 3 is a side elevation of a saw and section of the roll box, showing the ribs and space blocks and the rake.

Fig. 4 is a section, illustrating the depth of the ribs and their widths and the arrangement of the ribs relative to the saws and the space blocks.

Similar characters of reference are used to indicate the same parts throughout the several views.

The drawings show a linting machine of the type in which the improvements are used. The machine is provided with a frame having upright members 20. A shaft 1 is used with space blocks 2 for the saws 3 which are held apart by the space blocks. The space blocks 2 are relatively thin so that the saws 3 can be placed close together. The ribs 4 are relatively narrow as to width so that the saws can be placed close together and the ribs are relatively deep to retain the required strength. The object is to place the saws close together as may be practical for the purpose above stated. In the re-organization, the teeth 5 of the rake 6 must be made narrower and the teeth of the rake are shorter than formerly as the seed will not crowd down in between the saws and it is not necessary that the teeth be so long as formerly. The seed will rather go down singly. After lint is stripped from the seed, the seed fall down in front of the machine as is customary. For this reason, the front of the machine stand and the front parts of the saws and rake are shown only in conventional form, except that the teeth of the rake are closer together. The saws are so close together that they form almost a continuous cylindrical surface and help to form the roll in the roll box and keep the seed turning with the roll until the lint is thoroughly removed from the seed. The rake 6 is adjustable by the usual rack 7 and gear 8.

The invention may be better understood by comparing the same with such patent as Ralston, No. 351,401, Oct. 26, 1886. The invention shown in my application has different space blocks and different ribs above described. The ribs 4 are thin and strength is obtained by making the ribs deeper. It follows from this construction of the ribs 4 and space blocks 2 of my application that an increased number of ribs and saws can be used without making the shaft longer and the advantages obtained as set forth in the opening paragraph above.

The ribs 4 are held in place by a steel bar 9 and a lip 10 or bar on the roll casing which is recessed to receive the upper end of the ribs. The steel ribs, being narrow, cannot be held by screws as formerly. The ends of the ribs are clamped between the bar 9 and the bar or lip 10 by screws 11 whose heads are countersunk in the casing member 12. At the lower ends, the ribs are held in place by a steel channel bar 13 and a steel bar 14 which is cut away to form a recess for the ends of the ribs 4. The foot retaining bar 14 is clamped on the ends of the ribs 4 by screws 15. Sufficient space must be left on the side of the bar 15 adjacent to the bar 13 so that the bar 14 will be clamped on the ends of the ribs.

What I claim is:—

1. A cotton seed delinting machine having a frame and a saw shaft journaled in said frame, relatively narrow and deep ribs attached to said frame, saws rigid with said shaft with portions thereof projecting between said ribs, said saws preventing the passage of undelinted seed down between the saws on said ribs, and a rake having short teeth projecting between said saws.

2. A cotton seed delinting machine having a frame and a saw shaft journaled in said frame, relatively narrow and deep ribs, steel frame bars attached to said frame and recessed steel bars attached thereto and clamping the ends of said ribs against said steel frame bars, and saws rigid with said shaft and running between portions of said ribs and in close proximity thereto and preventing the packing of undelinted seed on said ribs between the saws and aiding in forming a roll in the roll box.

3. A cotton seed delinting machine having a frame and a saw shaft journaled in said frame, relatively narrow and deep ribs, a flat steel bar attached to said frame and supporting the upper ends of said ribs and a channel steel bar attached to said frame and supporting the lower ends of said ribs, recessed steel bars attached to said flat steel bar and said channel steel bar and clamping the ends of said ribs on said flat bar and channel bar, and saws rigid with said shaft and running between portions of said ribs and in close proximity thereto for stripping the lint from the seed and preventing the packing of undelinted seed between the saws.

4. A cotton seed delinting machine having a frame and a saw shaft journaled in said frame, saws and relatively narrow space blocks rigid with said shaft for permitting the location of said saws close to each other for preventing the passage of undelinted seed between the saws, relatively narrow and deep ribs attached to said frame with portions thereof projected between portions of said saws, and a rake provided with relativly short teeth projected between portions of said saws.

5. A cotton seed delinting machine having a frame and a saw shaft journaled in said frame, saws rigid with said shaft, thin and deep ribs attached to said frame and projected between portions of said saws, and narrow space blocks rigid with said shaft, said ribs and space blocks being relatively close together making provision for increasing the number of said saws without increasing the length of said shaft and without making the frame larger and positioning said saws in close proximity to each other for preventing undelinted seed from passing down between the saws and crowding on said ribs.

6. A cotton seed delinting machine having a frame and a saw shaft journaled in said frame, narrow space blocks for positioning saws in close proximity to each other, saws rigid with said shaft and held in place by said space blocks, and narrow and deep ribs projected between portions of said saws and cooperating with said saws for forming a roll in the roll box of the machine, said saws preventing undelinted seed from crowding down between the saws against said ribs.

In testimony whereof, I set my hand, this 8th day of October, 1928.

DICK TAYLOR.